(12) United States Patent
Bekritsky et al.

(10) Patent No.: US 8,374,111 B2
(45) Date of Patent: Feb. 12, 2013

(54) DIGITAL SIGNAGE WITH ON-DEMAND POWER WAKE UP

(75) Inventors: Benjamin J. Bekritsky, Modiin (IL); Karthik Lakshminarayanan, Ronkonkoma, NY (US); Thomas D. Bianculli, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 326 days.

(21) Appl. No.: 12/824,964

(22) Filed: Jun. 28, 2010

(65) Prior Publication Data
US 2011/0317601 A1    Dec. 29, 2011

(51) Int. Cl.
*G08C 17/00* (2006.01)
(52) U.S. Cl. ........................ 370/311; 455/574
(58) Field of Classification Search .......... 370/216–252, 370/310–350; 455/574
See application file for complete search history.

(56) References Cited

U.S. PATENT DOCUMENTS

| 2007/0026818 | A1 | 2/2007 | Willins et al. |
| 2009/0323583 | A1* | 12/2009 | Scott ........................... 370/316 |
| 2010/0150042 | A1* | 6/2010 | Oh et al. ..................... 370/311 |
| 2010/0216523 | A1* | 8/2010 | Sebastiano et al. ........... 455/574 |

OTHER PUBLICATIONS

Thomas Kuehnel et al—"WAKE-on WLAN"—IEEE 801.11-07/0260r1, Mar. 2007—7 pages.

* cited by examiner

*Primary Examiner* — Ricky Ngo
*Assistant Examiner* — Kan Yuen
(74) *Attorney, Agent, or Firm* — Brian M. Mancini

(57) ABSTRACT

A technique for on-demand power wake up for digital signage includes providing 400 a detector operable to detect an envelope of a digital signal, receiving 402 an extended length packet by the detector, wherein the packet consists of a same, repeated data symbol, detecting 404 the extended length packet in the detector to provide an output signal, comparing 406 the output signal against a reference threshold, and providing 410 a wake up signal if the output signal exceeds the reference threshold. This can then be followed by receiving 416 information to display on the sign.

13 Claims, 4 Drawing Sheets

FIG. 1 - PRIOR ART -

DIGITAL SIGNAGE WITH ON-DEMAND POWER WAKE UP

FIELD OF THE DISCLOSURE

The present invention relates generally to digital or electronic signs and more particularly to power wake up control for digital signs.

BACKGROUND

At present, many different types of programmable, digital or electronic signs exist. The target markets for such signs can be in retail, manufacturing or healthcare environments, for example. Typically these signs are powered by a line voltage and can be programmable through a wired control connection to provide specific text or graphic images. Remote signage has also been developed where a sign can be programmed remotely using wireless signaling to a radio receiver in the sign. These remote signs may be line powered, or can be powered by a self-contained source such as a battery or even solar power. Of course it should be realized that a self-powered electronic sign that includes a radio receiver can experience power issues with not only powering a display device but also powering the radio receiver to receive programming instructions.

One solution to the power problem of a remote, self-powered sign is to place the digital sign in a sleep mode, where the radio receiver of the sign wakes-up at predetermined times to check if there is any updated programming for the sign. However, even if the radio is only on for twice a day, for fifteen seconds each, it turns out that the remote power supply for the sign is still unsustainable, and the battery will need recharging.

Accordingly, there is a need to power control for digital signs that allows a remote, self-powered digital sign to sustain its power. It would also be of benefit if the digital sign could be programmed at more than two specific times a day.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
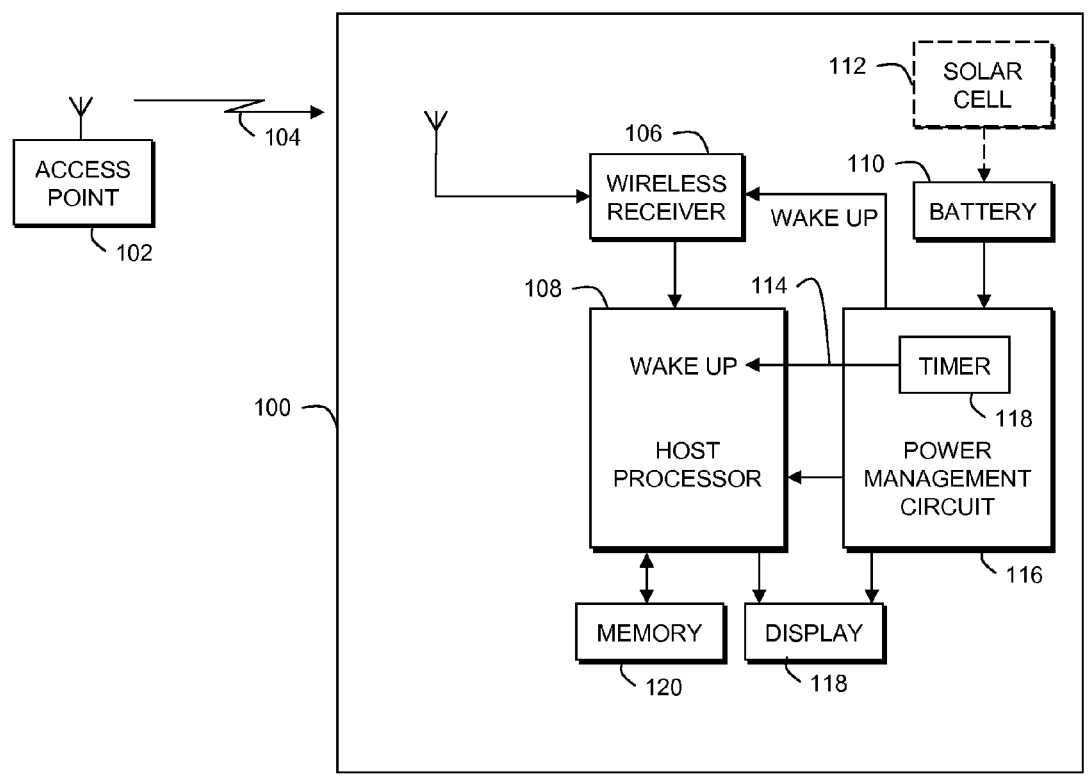
FIG. 1 is a simplified block diagram of a prior art digital signage power control system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique for power control wake up for a remote digital sign that allows the sign to sustain its power. The present invention also allows the digital sign to be programmed at any time of day, on demand. In particular, the present invention includes a low power RF receiver used to detect one or more Ethernet packet, where the packets are coded to wake up a sign's wireless receiver.

The present invention provides an advantage for self-powered, digital or electronic signage that are programmable through a wireless radio receiver in the sign. Such signs are used in retail, manufacturing, and healthcare environments, and the ability to program such signs increase the efficiency and speed of promotions and price changes. For example, the present invention allows a sign to be programmed with a price change, virtually in real time. In addition, a sign could be programmed for short-time, special promotions. Further, individual signs can be individually addressed for location-specific programming updates. Prior art programmable, remote signage can not provide these advantages since they can only wake up twice a day at pre-determined times.

It is envisioned that the self-powered digital sign of the present invention would be energy neutral, using a hybrid approach between energy harvesting techniques and conventional batteries, i.e. a battery that is charged with a solar cell driven by fluorescent lighting in the environs of the sign. It is assumed that a typical environ of the sign will provide 500 lux illuminance fluorescent lighting for fifteen hours a day, which would be sufficient to sustain the power of a sign when the energy harvesting efficiency at 85%. This efficiency can be readily achievable by augmenting the solar cell using luminescent solar collectors or fluorescent concentrators, as are known in the art. Reaching the energy neutral point (self-powering) is also possible when a low-power, reflective, bi-stable display technology (such as e-ink or Cholesteric systems) is used in this application.

FIG. 1 is a block diagram depiction of a prior art, self-powered, digital sign 100 with a wireless radio receiver 106 and battery 110. In one version, the battery could be charged with a photovoltaic (solar) cell 112 using ambient light. The sign 100 includes a host processor 108, power management circuit 116, display 118, and optionally a non-volatile (flash) memory 120. In order to conserve energy, the wireless receiver 106 and host processor 108 operate in sleep mode, wherein the power management circuit will periodically power up the wireless receiver 106 and host processor 108 to receive instructions 104 transmitted by a network access point 102. These instructions can be stored in the memory 120.

The power management circuit 116 is programmed to wake up the sign circuitry at predetermined times (typically twice a day) that are known to the access point. In particular, the power management circuit 116 monitors a timer 118, and when a predetermined time occurs, a signal 114 is sent to wake-up the host processor 108 and wireless receiver 106 in order to receive any instructions 104 for changing information presented on the display 118. The disadvantage here is that the power management circuit 116 is required to have some of its internal circuitry constantly powered, such as the timer and a timer monitor. Another disadvantage is that the information presented on the display 118 can only be updated at the predetermined times instead of in real-time.

Figure 2:
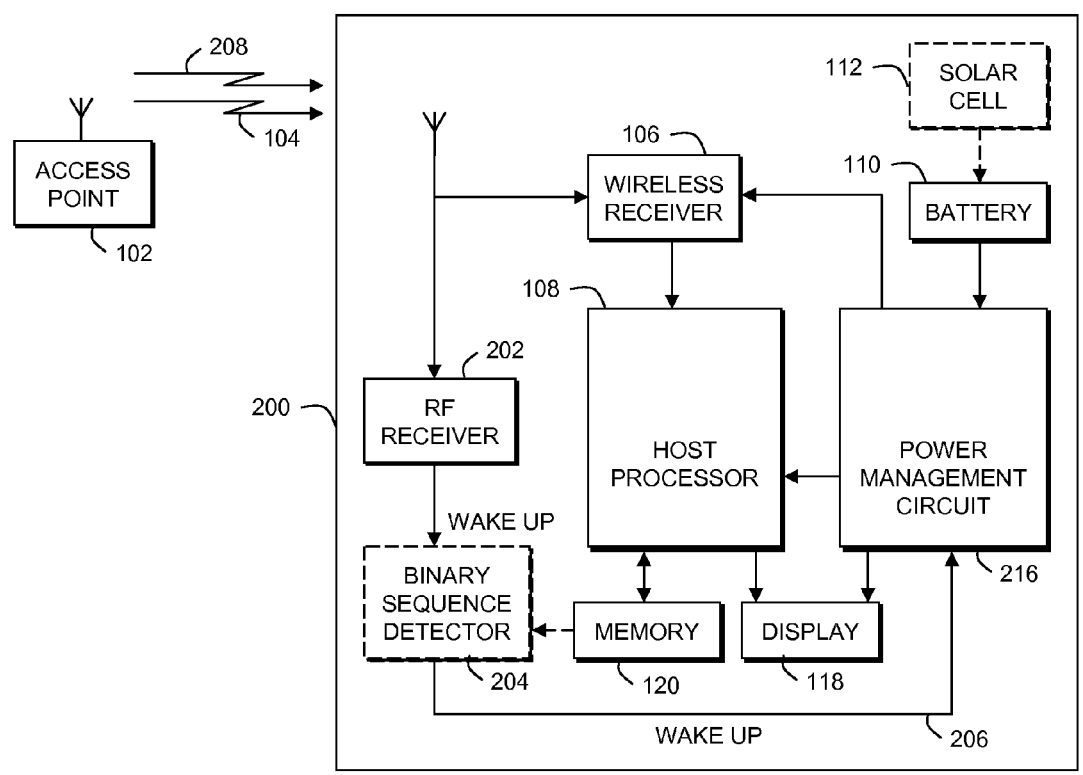
FIG. 2 is a simplified block diagram of a digital signage power control system, in accordance with the present invention.

FIG. 2 is a block diagram depiction of a self-powered, digital sign 200 with a wireless radio receiver, in accordance with the present invention, that can be operable on various different known wireless communication technologies. The wireless systems can include local and wide-area networks, or other IEEE 802.11 wireless communication system. However, it should be recognized that the present invention is also applicable to other wireless communication systems. For example, the description that follows can apply to one or more communication networks that are IEEE 802.xx-based, employing wireless technologies such as IEEE's 802.11, 802.16, 802.20, or Bluetooth™, modified to implement embodiments of the present invention.

The present invention has many similar components as the configuration of FIG. 1, with the exception of having a power management circuit 216 that does not require any constant power for its internal circuits, and the addition of detector operable to detect an envelope of a digital signal directly, the detector can include a low-power RF (video-like) receiver 202 and/or an optional binary sequence detector 204 or microprocessor. The RF receiver 202 is always powered on. However, low power circuitry can be provided, which uses less power than is used in the power management circuit 116 of FIG. 1. The RF receiver 202 receives packets 208 of a greater than typical length from the access point 102, which are decoded to wake-up the rest of the sign 200. Upon detecting such an extended-length packet, the a signal 206 is provided to wake up the power management circuit 216, which in turn powers up the host processor 108 and wireless receiver 106 to receive instructions 104 to update the display 118 transmitted by a network access point 102. These instructions can be stored in the memory 120. The advantage here is that the configuration of FIG. 2 uses less battery power than the configuration of FIG. 1. Another advantage is that the information presented on the display 118 can be updated on demand, in real-time.

Figure 3:
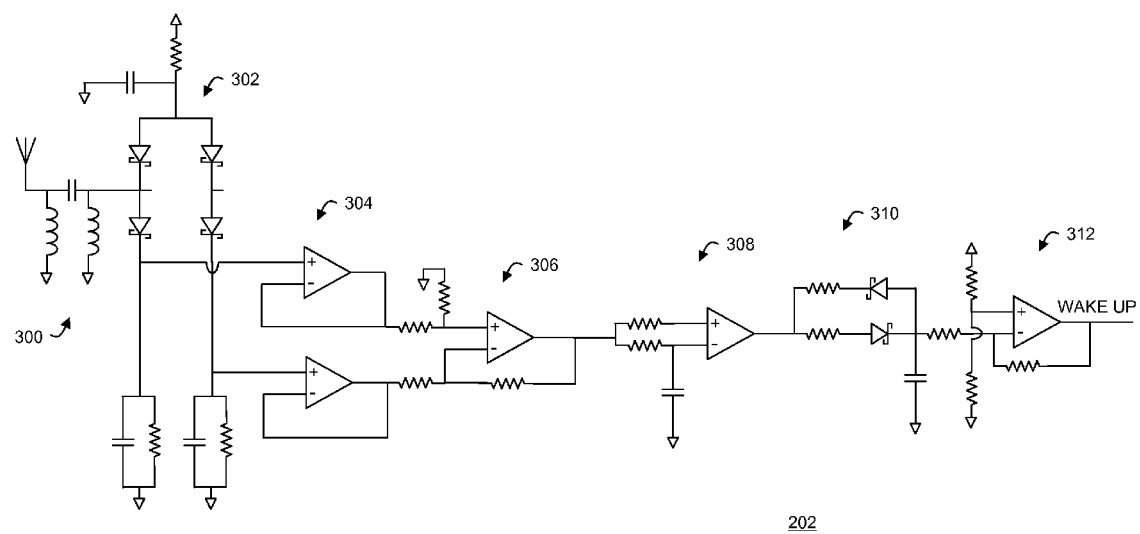
FIG. 3 is a schematic diagram of the radio frequency (RF) receiver of FIG. 2.

FIG. 3 is an example of the RF receiver 202 of FIG. 2 to detect packets of the IEEE 802.11 system directly from the antenna. The 802.11 system is operable on three channels in the 2.4 GHz frequency band, and is based on constant envelope modulation which makes it amenable to the envelope detection as will be described below in reference to FIG. 3. The RF receiver 202 includes tuning elements 300 that are tuned to one or more of the three 802.11 channels. The tuning elements 300 pass RF carrier symbols of a packet from the antenna to a rectifier circuit. The rectified signals are then fed to buffers 304, and then to a differential amplifier 306. The signal from the differential amplifier 306 is run through a common mode filter 308, and is further half-wave rectified 310 to be provided to a comparator 312. If a significant voltage is provided from the extended-length packet processed in the RF receiver 202, where the voltage exceeds a reference threshold, the comparator 312 will turn on, providing a signal 206 to wake-up the power management elements 106, 108, 216 of the digital sign 200. Optionally, binary sequence detector 204 can be woken up to process a decoded sequence of subsequent packets of different extended lengths used to address individual signs 200. If the decoded sequence matches an internal identifier of the sign (e.g. a sign MAC address, serial number, etc.) programmed into a non-volatile (flash) memory 120, or even a simple DIP switch setting that is hard coded with an identity, the binary sequence detector 204 can send the signal 206 to wake-up the power management elements 106, 108, 216 of the digital sign 200. It is envisioned that the wake-up signal could enable or disable a high side switch for any of the elements to be powered up (i.e. an N channel FET in series with the radio power supply).

The RF receiver is a video receiver or an envelope-detecting receiver that only responds to changes in energy of the signal or the envelope of the signal. With constant envelope phase modulation, such as in the IEEE 802.11 communication system, the RF receiver will not detect changes when the symbols of the packet change because the envelope remains the same. Therefore, the envelope-detection function of the RF receiver serves to measure the energy of a given packet. In effect, the receiver accumulates the energy of the long-string Ethernet packet. Accordingly, a novel aspect of the present invention is using an analog rectifying circuit 310 to detect a length of a digital packet.

In practice, during normal IEEE 802.11 signaling the highest modulation required is around −70 dBm signal strength for adequate block error rate, and most packets are very short, less than two milliseconds. In accordance with the present invention, the access point will send a very long Ethernet packet (up to a maximum of 1500 bytes at 1 Mbps, for about 12.5 ms). This is a packet length that is rarely seen in typical traffic. During tests, such a packet produces a signal of about −55 dBm in the RF receiver 202 for around 12.5 ms, which is the threshold used in the comparator 312 to provide the wake-up signal to turn on the sign radio 106. Even in overlapping cell coverage, the RF receiver does not see an output of −55 dBm for 12.5 ms for normal IEEE 802.11 signaling.

If the signs 200 need to be addressable, then the first very long packet 208 is used to turn on an ultra-low power binary sequence detector 204 or microprocessor instead. This detector 204 is used to detect a binary sequence of very long packets 208 that would subsequently be sent from the AP. If the sequence is detected then the detector 204 will turn on the radio for an update 106. If the sequence is not detected, then the ultra-low power detector 204 is turned off This strategy saves power as it prevents the main processor and the radio from turning on unnecessarily. It is envisioned that the binary sequence of very long packets could be of different lengths, which the detector 204 could interpret as a different codes (similar to a Morse code), or the binary sequence of very long packets of the same or different lengths could be sent at different time periods, which the detector 204 could again interpret as a different codes (similar to pulse-code-modulation) to be compared against the stored sign identity.

An power analysis was performed on the sign configuration of FIG. 2. A usage profile of two updates per day with each update taking fifteen seconds was assumed. With an active system current of 60 mA, a standby current of 100 μA, and using ambient 500 lux fluorescent lights on for 15 hours/day, with 85% energy harvesting efficiency, the energy required by the system of FIG. 1 every day was estimated to be 13 mWh, which when using a photovoltaic (solar) cell with or without a concentrator, could result in an energy-neutral sign. In comparison, an analysis of the sign configuration of FIG. 1 demonstrates a sleep current of 180 μA minimum, which would not be energy-neutral and would require supplemental power.

Figure 4:
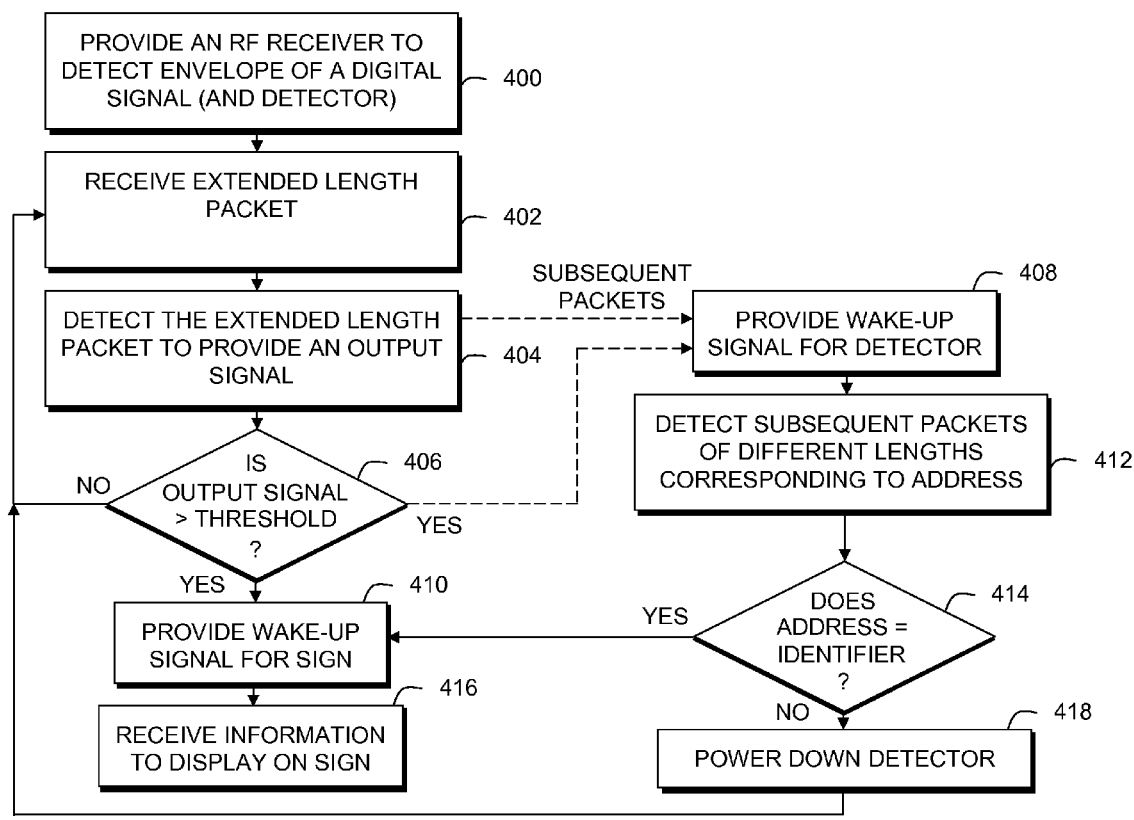
FIG. 4 is a flowchart of a method, in accordance with the present invention.

FIG. 4 illustrates a flowchart of a method for on-demand power wake up for digital signage, in accordance with the present invention.

The method includes providing 400 detector operable to detect an envelope of a digital signal directly, such as a a video or envelope-detecting RF receiver and/or binary sequence detector, as described above.

The method also includes receiving 402 an extended length packet by the detector. Optionally, the extended length can be a maximum length of a packet in the wireless communication system being used.

The method also includes detecting and rectifying 404 the extended length packet in the detector to provide an output signal.

The method also includes comparing 406 the output signal against a pre-determined reference threshold corresponding to a detected signal of packet length greater than a maximum packet length of the typical digital traffic in the wireless communication system being used.

If the output signal exceeds the reference threshold, providing 410 a wake-up signal for the sign including any one or more of a wireless receiver, host processor, and power management circuit. Otherwise nothing is done. The threshold and/or length of the extended packet can be determined empirically such that the output signal exceeds the reference signal by the predetermined threshold.

Providing 400 can also include a binary sequence detector. Wherein the providing step 410 provides the wake-up signal to the binary sequence detector. The binary sequence detector is used to provide unique addressing capability for signs.

For example, after a wake-up sequence is received, the RF receiver and binary sequence detector can detect 412 subsequent extended length packets of varying lengths or the same length repeated at different periods of time that are sent by the access point. As before, each of the subsequent extended length packets are rectified and compared against the reference threshold to confirm that they exceed the reference threshold. The different extended lengths or periods of time corresponding to an address of the sign. For example, detecting a longer extended length sequence followed by three shorter extended length sequences, could correspond to an address of "1000". It should be noted that the different extended length of all the packets are chosen to be still large enough to provide output signals that exceed the reference threshold.

The detected address is then compared 414 to an internal identifier in the sign, such as can be coded in a non-volatile memory or hard coded in a DIP switch. If a match is found, the binary sequence detector will providing 410 the wake up signal for the sign including any one or more of a wireless receiver, host processor, and power management circuit. If no match is found, the binary sequence detector powers down 418.

The method further includes receiving 416 information to display on the sign by the wireless receiver.

As described herein, there are various entities adapted to support the inventive concepts of the preferred embodiments of the present invention. Those skilled in the art will recognize that the present invention does not depict all of the equipment necessary for system to operate but only those system components and logical entities particularly relevant to the description of embodiments herein. For example, components such as processors, memories, and receivers are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. It is within the contemplation of the invention that the operating requirements of the present invention can be implemented in software, firmware or hardware.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for on-demand power wake up for digital signage, the method comprising:
    detecting an envelope of a digital signal, and upon detecting the envelope;
    receiving an extended length packet;
    detecting the extended length packet to provide an output signal;
    comparing the output signal against a reference threshold; and if the output signal exceeds the reference threshold,
    detecting subsequent extended length packets of different lengths corresponding to an address of the sign, each of the subsequent extended length packets being detected and compared against the reference threshold to confirm that they exceed the reference threshold, and
    comparing the detected address to an internal identifier in the sign, wherein if a match is found, providing a wake up signal for the sign;
    wherein the detecting includes a binary sequence detector, and further comprising providing the wake up signal to the binary sequence detector.

2. The method of claim 1, wherein the extended length in receiving is a maximum length of a packet in the wireless communication system being used.

3. The method of claim 1, wherein the reference threshold corresponding to a detected signal of packet length greater than digital traffic in the wireless communication system being used.

4. The method of claim 1, wherein providing a wake-up signal provides a wake-up signal to a power management circuit of the sign.

5. The method of claim 1, wherein providing a wake-up signal provides a wake-up signal to a wireless receiver of the sign.

6. The method of claim 1, further comprising receiving information to display on the sign.

7. A method for on-demand power wake up for digital signage, the method comprising:
    providing an RF receiver operable to detect an envelope of a digital signal, and providing a binary sequence detector coupled to the RF receiver, and upon detecting the envelope;
    receiving an extended length packet by the RF receiver;
    detecting the extended length packet in the RF receiver to provide an output signal;
    comparing the output signal against a reference threshold; and
    providing a wake up signal to the binary sequence detector if the output signal exceeds the reference threshold;
    detecting subsequent extended length packets of different lengths corresponding to an address of the sign, each of the subsequent extended length packets being detected and compared against the reference threshold to confirm that they exceed the reference threshold;
    comparing the detected address to an internal identifier in the sign, wherein if a match is found, the binary sequence detector providing the wake up signal for the sign; and
    receiving information to display on the sign.

8. The method of claim 7, wherein the wake up signal from the binary sequence detector is provided to a power management circuit of the sign.

9. The method of claim 7, wherein the wake up signal from the binary sequence detector is provided to a wireless receiver of the sign.

10. The method of claim 7, wherein the reference threshold corresponds to a detected signal of packet length greater than the digital traffic in the wireless communication system being used.

11. A digital sign with on-demand power wake up, the sign comprising:
    an RF receiver operable to receive a digital signal and detect an envelope of the digital signal, whereupon,
    a binary sequence detector is operable to receive an extended length packet, and detect the extended length packet to provide an output signal, and compare the output signal against a reference threshold, and if the output signal exceeds the reference threshold, the binary sequence detector is further operable to detect subsequent extended length packets of different lengths corresponding to an address of the sign, each of the subsequent extended length packets being detected and compared against an internal identifier in the sign, wherein if a match is found, the binary sequence detector provides a wake up signal for a power management circuit of the sign.

12. The digital sign of claim 11, wherein the wake up signal from the binary sequence detector is also provided to a wireless receiver of the sign.

13. The digital sign of claim 11, wherein the reference threshold corresponds to a detected signal of packet length greater than digital traffic in the wireless communication system being used.

* * * * *

UNITED STATES PATENT AND TRADEMARK OFFICE
CERTIFICATE OF CORRECTION

PATENT NO. : 8,374,111 B2  
APPLICATION NO. : 12/824964  
DATED : February 12, 2013  
INVENTOR(S) : Bekritsky et al.

Page 1 of 1

It is certified that error appears in the above-identified patent and that said Letters Patent is hereby corrected as shown below:

In the Specification

In Column 4, Line 34, delete "off" and insert -- off. --, therefor.

Signed and Sealed this  
Fourth Day of November, 2014

Michelle K. Lee  
*Deputy Director of the United States Patent and Trademark Office*